United States Patent [19]

Furuya et al.

[11] Patent Number: 4,682,312

[45] Date of Patent: Jul. 21, 1987

[54] DISC PLAYER WITH SEARCH NOISE SUPPRESSION

[75] Inventors: Tsuneo Furuya, Tokyo; Yoshizumi Inazawa, Yokohama, both of Japan

[73] Assignee: Sony Corporation, Tokyo, Japan

[21] Appl. No.: 837,028

[22] Filed: Mar. 6, 1986

Related U.S. Application Data

[62] Division of Ser. No. 497,404, May 23, 1983, Pat. No. 4,592,036.

[30] Foreign Application Priority Data

May 23, 1982 [JP] Japan .................................. 57-87157
May 25, 1982 [JP] Japan .................................. 57-88445

[51] Int. Cl.$^4$ ...................... G11B 20/10; G11B 20/24
[52] U.S. Cl. ......................................... 369/32; 369/59
[58] Field of Search ................... 360/32, 38.1; 371/31, 371/65; 358/342, 343, 336, 335; 369/32, 33, 59, 48, 49, 50

[56] References Cited

U.S. PATENT DOCUMENTS

| | | | |
|---|---|---|---|
| 4,142,209 | 2/1979 | Hedlund et al. | 358/342 |
| 4,224,642 | 9/1980 | Mawatari et al. | 360/32 |
| 4,246,615 | 1/1981 | Shiraishi et al. | 360/32 |
| 4,286,290 | 8/1981 | Pyles et al. | 358/342 |
| 4,485,412 | 11/1984 | Sugiyama et al. | 369/32 |
| 4,593,392 | 6/1986 | Kouyama | 360/38.1 |

*Primary Examiner*—Donald McElheny, Jr.

*Attorney, Agent, or Firm*—Lewis H. Eslinger; Alvin Sinderbrand

[57] ABSTRACT

A disc player, for reproducing program information from a disc on which the information is recorded as digital program information data accompanied by digital address data, comprises an optical reader for reading program information data and address data from the disc, such reader being selectively operable in a searching mode and in a playback mode, processing circuitry supplied with program information data to produce program information from the program information data, a detecting means that compares designated address data identifying desired program information with the reproduced address data in the output of the reader and system controlling means for controlling the reader to continue the searching mode until the reproduced address data match the designated address data, at which time the system controlling means operates the reader in its playback mode to read from the disc the program information data identified by the designated address data. Noise-suppressing means substantially prevents the processing circuitry from producing program information from the program information data in the output of the reader operating in the searching mode. The clicking noises and other spurious sounds produced by prior art disc players from the program information data read during the searching mode are thus prevented from occuring before the production of desired program information from the disc.

7 Claims, 6 Drawing Figures

DISC PLAYER WITH SEARCH NOISE SUPPRESSION

This is a divisonal of application Ser. No. 497,404, filed May 23, 1983, now U.S. Pat. No. 4,592,036.

BACKGROUND OF THE INVENTION

1. Field of the Invention

This invention relates to a method and an apparatus for reproducing program information from a medium in which noise generated by searching for predetermined program information on the medium is suppressed and, more particularly, to a disc player incorporating such a method and apparatus.

2. Description of the Prior Art

In a known recording system a rotatable disc-shaped record medium is used to record digital data representing an audio signal. The digital data are arranged in data blocks that include program information data representing the audio signal, data for error correction, synchronous data and address data. A disc player is used to reproduce the audio signal from the digital data recorded on the disc. With such a system, very high fidelity reproduction of the audio signal can be obtained.

However, errors in the program information data read by the disc player can affect the reproduced audio signal. Generally, digital data recorded in any medium inevitably contain data errors caused in the recording process. Such data error appear infrequently enough that a high fidelity audio signal can still be obtained from the program information data using error correction techniques. Fingerprints and scratches on the surface of the disc also can cause data errors because they prevent accurate reading of the program information data recorded on the disc.

Accordingly, recording and reproducing systems using digital data on a disc incorporate a cross-interleave error correction technique for correcting errors that appear in the program information data read from the disc. In recording data using a cross-interleave error correction technique, a first error correcting code for a first code arrangement stage and a second error correcting code for a second code arrangement stage are provided, and then an interleave is carried out between the first and second stages. Using a Reed-Solomon code for the error correcting codes and the interleave technique allows very accurate error correction of the reproduced program information data. However, the corresponding processing circuitry in the disc player for using that error correcting technique requires a finite time, called a de-interleave delay, to convert into program information the program information data read from the disc. That delay causes a problem.

The address data recorded on the disc with the program information data make it possible to reproduce selectively any desired portion of the program information data. The reading device in the disc player is made operative in a searching mode and address data contained in the output from the reading device is compared with designated address data associated with the location on the disc of the desired program information. The reading device is operated in the searching mode until the reproduced address data coincide with the designated address data. The reading device is then made operative in a playback mode to read the program information data at the location on the disc where the address data match the designated address data.

The output of the reading device in the searching mode also intermittently contains small amounts of program information data, which is supplied to the processing circuitry and converted into an audio signal after the de-interleave delay time. The audio signal thus obtained appears as a clicking noise or other undesired sound before the selected program information data is reached and converted into the desired program information. The de-interleave delay prevents suppression of that noise merely by preventing conversion of program information data into program information while the reading device is in the searching mode because the program information data in the output of the reading device can still be undergoing conversion after the searching mode is terminated.

OBJECTS AND SUMMARY OF THE INVENTION

Accordingly, it is an object of the present invention to provide a method and an apparatus for reproducing program information from a medium that avoids the above described problem encountered in prior art apparatus.

It is another object of the present invention to provide for reproducing digital program information data from a disc and suppressing the production of noise caused by operation in a searching mode.

According to an aspect of the present invention, program information is reproduced from a medium containing a plurality of blocks of program information data, each block including address data. During a searching mode, an output is provided containing program information data and address data used in locating predetermined address data. The predetermined address data is detected in the output and, in response to such detection, the medium is read in a playback mode to provide an output comprising program information data for conversion into program information. The conversion into program information of program information data provided during the searching mode is suppressed.

In accordance with one embodiment of the present invention, a clearing period is provided after the playback mode begins when the output contains substantially no program information data and the conversion of program information data into program information is suppressed for a predetermined muting time after the predetermined address data is detected, the clearing period being at least as long as the muting time.

In accordance with another embodiment of the present invention, a silent-data signal corresponding to program information data containing substantially no program information for conversion into program information is generated during the searching mode.

The above and other objects, features and advantages of the present invention will be apparent from the following detailed description taken in conjunction with the accompanying drawings.

DETAILED DESCRIPTION OF ILLUSTRATIVE EMBODIMENTS

Figure 1:
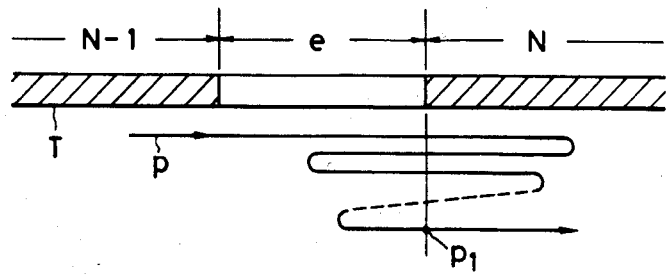
FIG. 1 is an illustration of one type of searching operation that causes the production of undesired audio signals in prior art disc players.

FIG. 1 depicts a searching operation that illustrates the problem with spurious search noise encountered in prior art disc players. Assume that the reproduction of program information on a disc is to commence at the beginning of a recorded area N in a record track T on the disc. The disc player reading device, operated in its searching mode, moves along the path p in FIG. 1. In doing so the reading device repeatedly goes over areas containing program information data, such as the recorded area N, and areas where no program information data are recorded, such as the area e located between the recorded area N and a recorded area N-1. The reading device repeatedly moves across the disc until it reaches a position $p_l$ that corresponds to the beginning of the recorded area N.

When the address data provided at the beginning of the recorded area N are read out at the position $p_l$ by the reading device and compared with the designated address data, the disc player determines that the reading device has reached the selected location. Consequently, the reading device is made operative in its playback mode and reads the program information data in the area N from its beginning.

During the searching mode, and before the desired audio signal is produced from the program information data in the area N provided in the output of the reading device operating in its playback mode, the reading device provides an output containing not only address data but also program information data. During the searching mode, that unwanted program information data are supplied to the decoding circuitry and are converted into an audio signal after the de-interleave delay time (normally about 13.5 msec). The program information data, provided during the searching mode, appears as a clicking noise or other spurious audio signal.

Figure 2:
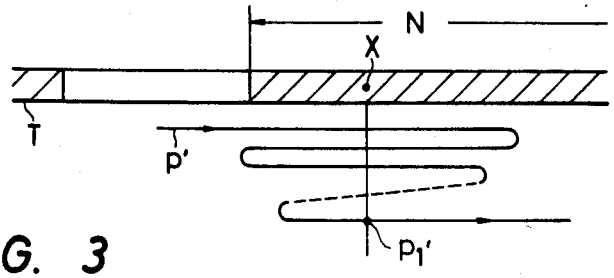
FIG. 2 is an illustration of another type of searching operation that causes the production of undesired audio signals in prior art disc players.

FIG. 2 illustrates the same problem in a case in which the reproduction of program information data is to be commmenced at a specific location X within a recorded area N. The reading device, operating in its searching mode, moves on the record track T in the path p'. The reading device thus repeatedly goes over the location X while the amount of movement of the reading device is narrowed down, finally stopping at the location X.

When the address data at the specific location X within the recorded area N are read out at the position $p_l'$ by the reading device and compared with the designated address data, the disc player determines that the reading device has reached the selected location. Consequently, the reading device is made operative in its playback mode and reads the program information data in the recorded area N, beginning at the location X.

As in the example discussed in connection with FIG. 1, before the desired audio signal is obtained from the program information data in the area N, the program information data provided by the reading device operating in its searching mode are supplied to the decoding circuitry and are converted into an audio signal after the de-interleave delay time. Thus, the same undesirable clicking noise or other spurious sound is produced by the searching operation.

Figure 3:
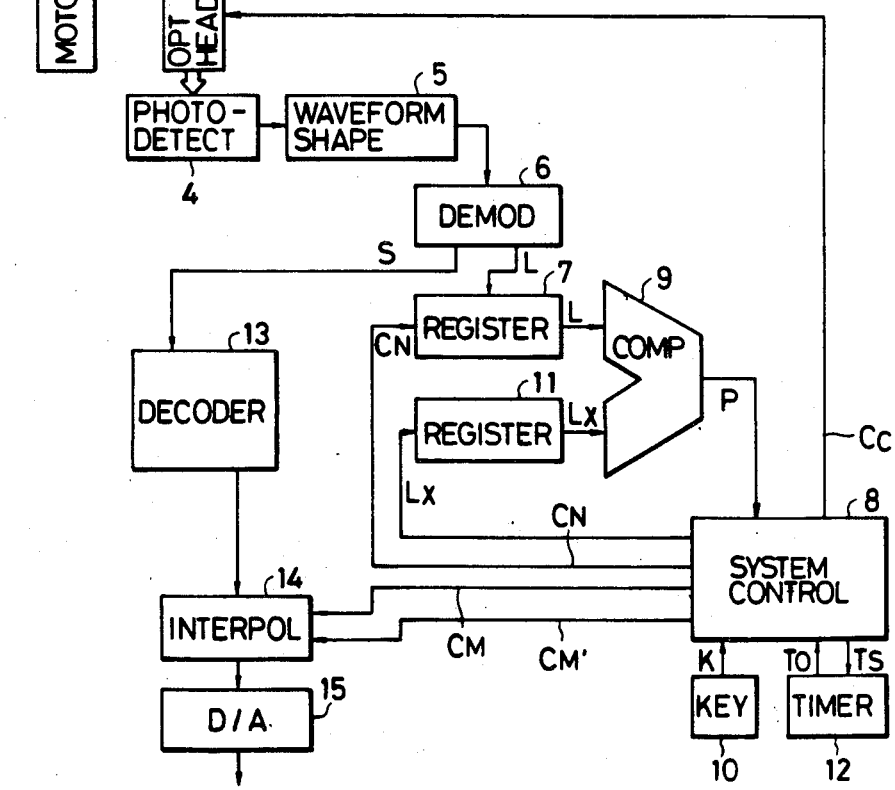
FIG. 3 is a schematic block diagram showing a disc player incorporating a first embodiment of the present invention.

FIG. 3 shows a disc player according to one embodiment of the present invention that overcomes the problem associated with the searching operation depicted in FIG. 1. A disc 1 containing digital program information data accompanied with digital address data is rotated by a motor 2. The program information data and the address data recorded on the disc 1 are provided in the output of a reading means, which in this embodiment comprises an optical head 3 that directs laser light toward the disc 1 and receives reflected laser light from the disc 1. The reflected light is modulated in response to the data contained on the disc. A photodetector 4 converts the modulated reflected light into an electrical signal containing the program information data and the address data on the disc 1. The electrical signal from the photodetector 4 is shaped by a waveform shaping circuit 5 into a suitable digital signal. The digital signal thus obtained is supplied to a demodulator 6 that separates the program information data and the address data and provides them in the form of output program information data S and output address data L. The output address data L are supplied to a first register 7 to be held therein until they are read out in response to a control signal $C_N$, supplied from a system controlling means 8, to one input terminal of a detecting means 9, as explained below.

A keyboard 10 supplies a keying signal K to the system controlling means 8. The keyboard 10 comprises a designating means by which an operator can designate for playback predetermined program information by causing the system controlling means 8 to produce predetermined designated address data $L_x$ locating the predetermined program information on the disc in response to the keying signal K. The predetermined address data $L_x$ are supplied to a second register 11 to be held therein. The predetermined address data $L_x$ are supplied from the second register 11 to the other input terminal of the detecting means 9. The detecting circuit 9 compares the output address data L with the predetermined address data $L_x$, which at this time do not match. An operational signal P, obtained as a result of that comparison, is supplied to the system controlling means 8. A mode control signal $C_C$ is supplied to the optical head 3 to establish the searching mode, in which the optical head 3 selectively operates for normal reproduction and for performing a fast-forward operation, a fast-reverse operation, a one-track-forward jumping operation and a one-track-backward jumping operation. The system controlling means 8 thus supplies a first mode control signal, effectively in response to the keying signal K, to establish the searching mode of the optical head 3. A timer 12 having a set time of, for example, 15 msec is triggered by a timer trigger signal $T_S$ provided by the system controlling means 8 when the operational signal P assumes the form of a match signal indicating that the output address data L coincide with the predetermined address data $L_x$. In response to the trigger signal $T_S$ the timer 12 provides an overflow signal $T_0$ to the system controlling means 8 when the set time from the receipt of the triggering signal $T_S$ has lapsed.

Meanwhile, the output program information data S from the demodulator 6 are supplied to decoding circuitry 13 for performing error detection according to the cross-interleave technique, as described in more detail below. The decoded program information data obtained from the decoding circuitry 13 are supplied to an interpolating circuit 14 in which detected errors are corrected by interpolation. The interpolating circuit 14 receives also a muting command signal $C_M$ and a muting release signal $C_M'$ from the system controlling means 8 for selectively actuating and deactuating muting means for suppressing the operation of the interpolating circuit 14 when actuated. The error-corrected, decoded program information data from the interpolating circuit 14 are supplied to a digital-to-analog converter 15 for producing an audio signal representing the program information. The decoding circuitry 13, the interpolating circuit 14 and the digital-to-analog converter 15 thus comprise processing circuit means for converting program information data into program information.

Figure 4:
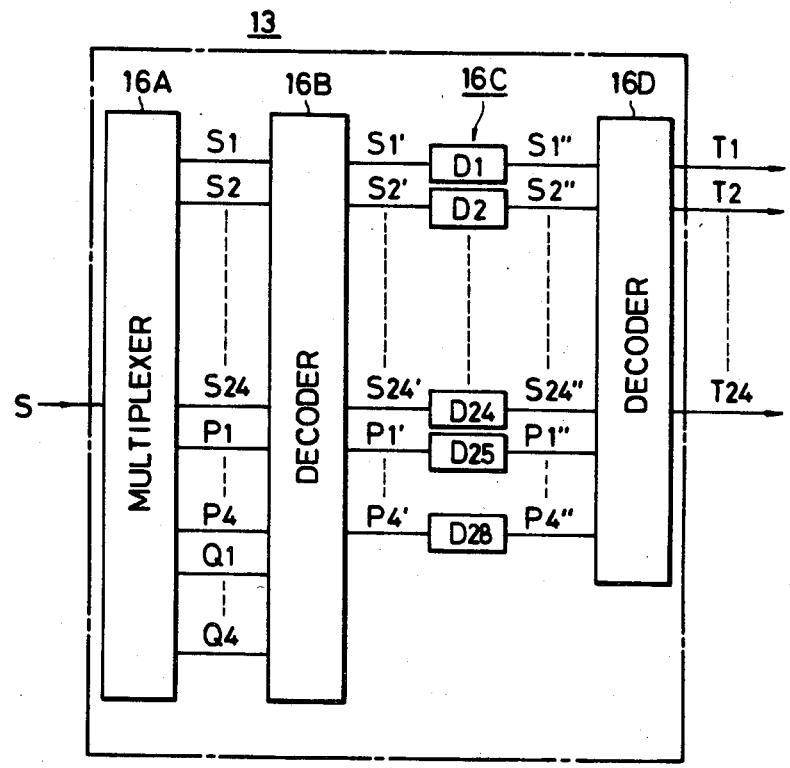
FIG. 4 is a schematic block diagram showing in detail the operation of the decoding circuitry used in the disc player of the present invention.

FIG. 4 shows in more detail the decoding circuitry 13. The decoding circuitry 13 comprises a mutliplexer 16A, a first decoder 16B, a de-interleaver 16C, which includes a plurality of delay devices $D_1$, $D_2$, etc., and a second decoder 16D.

The output program information data S from the demodulator 6 are supplied to the multiplexer 16A. That data comprise thirty-two words, including twenty-four audio signal data words $S_1$ to $S_{24}$, four first error-correcting words $P_1$ to $P_4$ and four second error-correcting words $Q_1$ to $Q_4$ in each data block. The output program information data S thus appear at the output of the multiplexer 16A as parallel output data. These thirty-two words are supplied to the first decoder 16B. In the first decoder 16B, the first error correction for the data comprising the twenty-four audio signal data words $S_1$ to $S_{24}$ and the four first error correcting words $P_1$ to $P_4$ is carried out by using the four second error correcting words $Q_1$ to $Q_4$. The first decoder 16B thus derives data comprising twenty-four audio signal data words $S_1'$ to $S_{24}'$ and four first correcting words $P_1'$ to $P_4'$ all of which have been subjected to the first error correction process. At every individual word of the data of these twenty-eight words, a pointer (such as an additional bit) is added to indicate whether there is an error in the associated word or not.

The output data from the first decoder 16B are applied to the de-interleaver 16C which has the delay lines $D_1$ to $D_{28}$ with respective different delay amounts provided for the twenty-eight transmission channels through which the twenty-eight words from the first decoder 16B are respectively transmitted. With the delay lines $D_1$ to $D_{28}$, the twenty-eight words from the first decoder 16B are delayed for de-interleaving and twenty-four audio signal data words $S_1''$ to $S_{24}''$ and four first error correcting words $P_1''$ to $P_4''$ are derived from the de-interleaver 16C. The sum of the delay amounts caused by the delay lines $D_1$ to $D_{28}$ (the de-interleave delay time) is typically about 13.5 msec. The output from the de-interleaver 16C is then supplied to the second decoder 16D. In the second decoder 16D, the second error correction for the twenty-four audio signal data words $S_1''$ to $S_{24}''$ is carried out by using the four first error correcting words $P_1''$ to $P_4''$. The second decoder 16D thus derives twenty-four final audio signal data words $F_1$ to $F_{24}$ that have been subjected to the second error correction process and comprise decoded program information data. At every individual word of these twenty-four words, a pointer is added to indicate whether or not there is an error in the associated word.

The decoded program information data $F_1$ to $F_{24}$ thus obtained are supplied to the interpolating circuit 14 for error correction by interpolation for the words having the pointer added thereto. Then, the error-corrected, decoded program information data are supplied to the digital-to-analog converter 15. The digital-to-analog converter 15 converts the data from the interpolating circuit 14 into an audio signal representing the program information on the disc.

Figure 5:
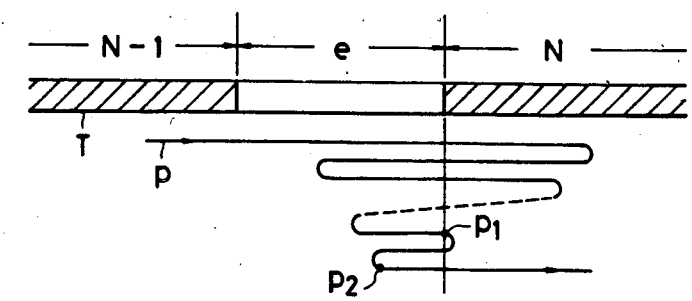
FIG. 5 is an illustration of the searching operation performed by the embodiment of the present invention shown in FIG. 3.

FIG. 5 illustrates the operation of the embodiment of the present invention shown in FIG. 3 in relation to the reproduction of program information in a record track T on a disc 1 commencing at the beginning of a recorded area N.

First, the keying signal K, which will be used to eventually position the optical head 3 at the beginning of the recorded area N, is supplied to the system controlling means 8 from the keyboard 10. In response to the keying signal K, the system controlling means 8 provides the muting command signal $C_M$ to the interpolating circuit 14 so that the muting means in the interpolating circuit 14 is actuated to block the provision of the error-corrected, decoded program information data from being supplied to the digital-to-analog converter 15. Simultaneously, the system controlling means 8 provides the predetermined address data $L_x$, which corresponds to the address data at the beginning of the recorded area N, to the second register 11. The mode control signal $C_c$ assumes its first form in which the optical head 3 is placed in the searching mode. The predetermined address data $L_x$ are supplied to the operational circuit 9 from the second register 11 and the output address data L obtained from the photodetector 4 are supplied to the first register 7 and from there to the operational circuit 9. The operational circuit 9 compares the output address data L with the predetermined address data $L_x$. When the output address data L do not match the designated address data $L_x$, the mode control signal $C_c$ continues to operate the optical head 3 in its searching mode. During the searching mode, a comparison between the output address data L and the predetermined address data $L_x$ is performed by the operational circuit 9 whenever address data on the disc 1 are read out by the optical head 3. The first mode control signal $C_C$ is varied in accordance with the operational signal P obtained in response to the result of that comparison in the operational circuit 9. As a result, the optical head 3 is moved in an optimum fashion until the output address data L match the predetermined address data $L_x$. The optical head 3 in the searching mode thus moves in a path p as shown in FIG. 5. That is, in the searching mode, the optical head 3 repeatedly travels forward and backward over recorded areas and areas containing no data and the amount of overshoot of the selected location narrows until the optical head 3 reaches the position $p_l$ corresponding to the beginning of the area N. During this narrowing, reciprocating movement of the optical head 3, any program information data in the output of the optical head 3 are supplied to the decoding circuitry 13 as output program information data S.

The address data at the beginning of the area N are read out when the optical head 3 reaches the position $p_l$. Since the output address data L at the position $p_l$ match the predetermined address data $L_x$, the operational signal P from the detecting means 9 will assume the form of a match signal. The mode control signal $C_C$ from the system controlling means 8 will assume a second form to cause the optical head 3 to establish a playback mode. To begin the playback mode, the optical head 3 performs a one-track-backward jumping operation and enters the area e, where no data are recorded, thereby placing the optical head 3 at a position $p_2$. The position $p_2$ is thus distant from the position $p_l$ by one track and it will take 0.2 to 0.3 seconds for the optical head 3 to return to the position $p_l$ from the position $p_2$ when in the playback mode. After the backward jump by one track of the optical head 3, the mode control signal $C_C$ causes the optical head 3 to operate in the normal playback mode.

The optical head 3, which has been placed at the position $p_2$ and has begun to operate in the playback mode, scans the area e from the position $p_2$ to the position $p_1$. During the period in which the optical head 3 scans the area e, its output contains substantially no program information data. The optical head 3 then again enters the area N and reads out the program information data from the beginning thereof.

Meanwhile, as the optical head 3 begins its travel from the position $p_2$ in the playback mode, program information data that was read when the optical head 3 was operating in the searching mode can still be undergoing de-interleaving in the decoding circuitry 13. In other words, just before a match between the predetermined and output address data is found, the optical head 3 will have provided output program information data to the decoding circuitry 13. When the optical head 3 then begins its playback mode in response to that match, the "residual" undesired program information data, because of the delay inherent in the operation of the decoding circuitry 13, is still undergoing de-interleaving. The maximum delay, from the time an address data match is found until all residual program information data "clears" the decoder circuitry 13, will be the de-interleave delay, in this case about 13.5 msec.

Program information data processed by the decoder circuitry 13 during the searching operation is suppressed by the muting means that controls the operation of the interpolation circuit 14 in response to the mute command signal $C_M$. When an address data match is established, the timer 12 is started by the triggering signal $T_s$, generated by the system controlling means 8 in response to the indication of a match by the match signal. When the timer set time has run, the overflow signal $T_o$ from the timer 12 causes the system controlling means 8 to provide the mute release signal $C_M'$ to deactuate the muting means and release the suppression of the interpolating circuit 14. If the timer set time slightly exceeds the de-interleave delay of 13.5 msec, none of the output program information data, including the residual data, provided while the optical head 3 was operating in the searching mode is converted into program information. A timer set time of 15 msec will establish a suitable muting time if the de-interleave delay is 13.5 msec. Moreover, because the muting of the residual program information data takes place during the operation of the optical head 3 in a clearing period when it is reading the area e of the disc 1 where no data is recorded, the extended muting that takes place after a match of predetermined and output address data is established does not interfere with the reproduction of the desired program information signal.

Figure 6:
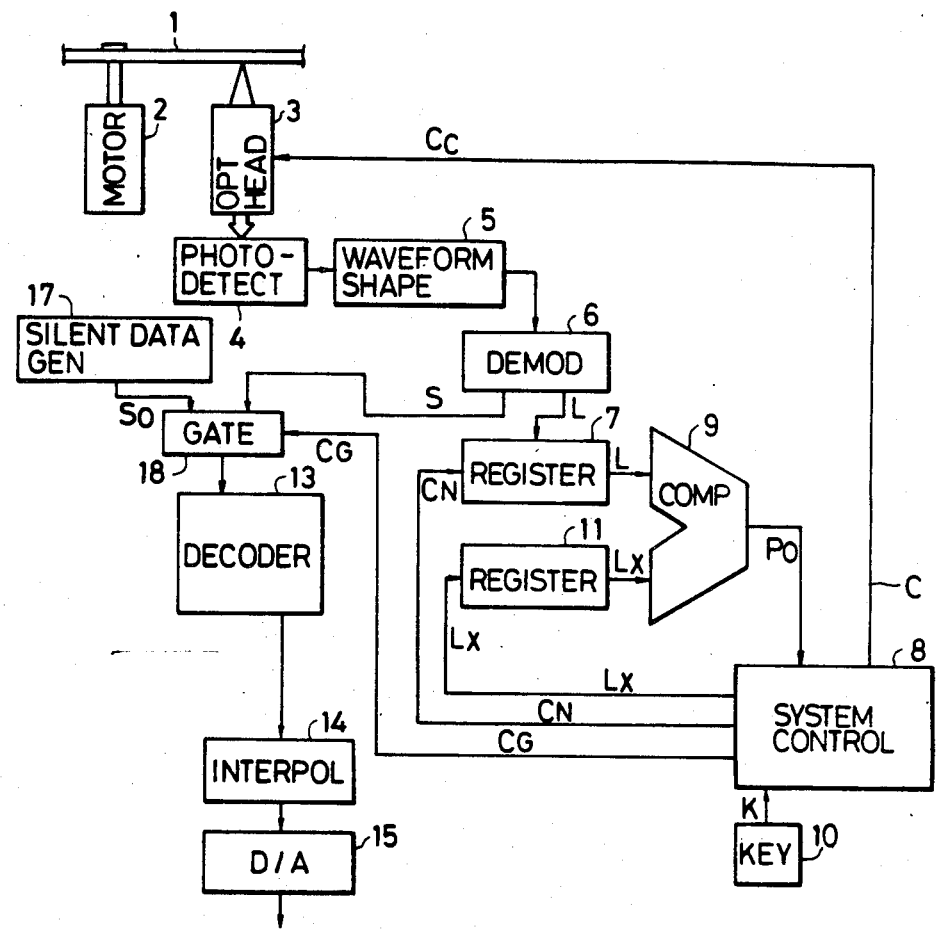
FIG. 6 is a schematic block diagram showing a disc player incorporating another embodiment of the present invention.

FIG. 6 is an alternate embodiment of a disc player according to the present invention. In FIG. 6, those parts corresponding to the parts shown in FIG. 3 are marked with the same references and a further description thereof will be omitted here. In this embodiment a silent-data generating mean 17 is provided to produce a silent-data signal $S_0$. The silent-data signal $S_0$ corresponds to program information data received from the disc 1 when reading an area containing no program information. The silent-data signal $S_0$ from the silent-data generating means 17 and the output program information data S are supplied to respective input terminals of a gate means 18. The gate means 18 is controlled by a gate controlling signal $C_G$ supplied from the system controlling means 8 to provide from the gate means 18 either the silent-data signal $S_O$ or the output program information data S, depending on the gate controlling signal $C_G$, and supply the same to the decoding circuitry 13. The output from the decoding circuitry 13 is supplied to the interpolating circuit 14 to be subjected to error correction by interpolation, as described above. The output from the interpolating circuit 14 is supplied to the digital-to-analog converter 15 and a reproduced audio signal representing the program information on the disc is obtained at the output of the digital-to-analog converter 15 in the same manner as described in connection with the embodiment shown in FIG. 3. However, when the silent-data signal $S_0$ is selected by the gate 18 and supplied to the decoding circuitry 13 in lieu of the output program information data S, no audio signal is obtained from the digital-to-analog converter 15.

The operation of the embodiment shown in FIG. 6 will be explained in connection with the reproduction of program information data at a specific location X in an area N, such as that shown in FIG. 2.

As before, the keying signal K from the keyboard 10 causes the system controlling means 8 to generate predetermined address data corresponding to that at the specific location X in the area N. In response to the keying signal K, the system controlling means 8 provides a first gate controlling signal to the gate 18 that causes the gate 18 to provide the silent-data signal $S_O$ to the decoding circuitry 13. Simultaneously, the system controlling means 8 also supplies the second register 11 with the predetermined address data $L_x$ corresponding to the address data at the location X. The first mode control signal is also supplied to the optical head 3 to establish its searching mode whereby it will eventually reach the location X by travelling along the path p' as shown in FIG. 2. That is, the optical head 3 repeatedly goes forward and backward over the specific location X and eventually reaches the position $p_1'$ corresponding to the specific location X. During the searching mode of the optical head 3, the silent-data signal $S_O$ supplied to the decoding circuitry 13 in lieu of the output program information data.

When the address data at the location X are read by the optical head 3, the output address data L will match the predetermined address data $L_x$, and the operational signal P will assume the form of a match signal. The mode control signal $C_C$ will assume its second form and switch the optical head 3 to its playback mode, in which the optical head 3 begins reading the program information data at the specific location X. Further, when the match signal is received by the system controlling means 8, the gate control signal $C_G$ will assume a second form to cause the gate 18 to provide to the decoding circuitry 13 the output program information data S received from the demodulator 6. The decoded program information data from the decoding circuitry 13 is supplied through the interpolating circuit 14 to the digital-to-analog converter 15, and the desired reproduced audio signal is obtained at the output of the digital-to-analog converter 15.

In this embodiment, the reproduction of undesired program information is avoided by supplying the silent-data signal $S_0$ from the silent data generating means 17 to the decoding circuitry 13 in lieu of the output program information data S during the searching operation mode and no program information data read during the searching mode reach the decoding circuitry 13. Accordingly, the desired program information, developed from the program information data read from the specific location X by the optical head 3 operating in its playback mode, can be obtained without any clicking or other spurious sound preceding it.

Of course, the location X can also be set at the beginning of the area N as shown in FIG. 1 and the reproduction of the program information data can be initiated there.

The embodiment shown in FIG. 6 does not require a cleang period where the optical head 3 reads a portion of the disc 1 where there is substantially no program information data while residual, undesired program information data clears the decoder circuitry 13, and thus can begin playback in the middle of an area containing program information data. The embodiment of FIG. 3 is suitable for use when the selected program information is preceded by an area containing no program information. However, the embodiment of FIG. 6 is suitable for more general application because it can more conveniently begin reproduction at any location on the disc and still suppress undesirable noise caused by the optical head 3 reading program information data operating in the searching mode.

The present invention has been described with reference to illustrative embodiments, but those skilled in the art will recognize that modifications and changes other than any specifically pointed out above can be made without departing from the spirit or scope of the present invention. Thus, the scope of the present invention is defined solely by the claims that follow.

What is claimed is

1. A reproducing apparatus for reproducing program information from a substantially planar disc containing a plurality of blocks of digital program information data, each block including address data, the apparatus comprising:

an optical head for reading said digital program information data and address data on said disc, said disc being moveable relative to said optical head, and for providing an output comprising reproduced digital program information data and address data, said optical head being selectively operable in a searching mode for locating predetermined address data associated with predetermined program information and a playback mode for providing program information data for conversion into said predetermined program information;

processing circuit means for converting obtained information data into a program information output, said processing circuit means cooperating with said optical head to obtain therefrom said reproduced program information data for conversion into said program information output, said processing circuit means including decoding circuitry for accepting said program information data in said output of said optical head and performing a decoding operation thereon to provide decoded program information data at a predetermined delay time from the start of said decoding operation;

detecting means for detecting said address data in said output of said optical head;

system controlling means for controlling said optical head when operating in said searching mode and for establishing said playback mode of said optical head in response to the detection of said predetermined address data by said detecting means; and noise-suppressing means including a silent-data generating means for cooperating with said processing circuit means to suppress the conversion into program information output of reprduced program information data while said optical head is in said searching mode, said silent-data generating means providing a silent-data signal corresponding to program information data substantially without program information to said processing circuit means in lieu of said reproduced program information data while said optical head is in said searching mode, said processing means converting said silent-data signal into silent program information, whereby noise generated by the conversion of reproduced program information data is suppressed while the optical head is in the search mode.

2. A reproducing device as in claim 1 wherein:

said noise-suppressing means further comprises gate means for receiving said silent-data signal and said program information data in said output of said optical head; and said system controlling means provides a gate controlling signal to said gate means for selectively providing to said processing circuit means said silent-data signal and said program information data in said output of said optical head.

3. A reproducing device as in claim 2 further comprising designating means for designating for playback said predetermined program information and for providing a keying signal to said system controlling means, wherein:

said detecting means comprises comparing means for generating a match signal when said address data in said output of said optical head match said predetermined address data; and said system controlling means, in response to said keying signal, provides a first gate controlling signal for providing said silent-data signal to said processing circuit means, provides to said comparing means said predetermined address data and provides a first mode control signal for establishing said searching mode of said optical head and, in response to said match signal, provides a second gate controlling signal for providing said program information data to said processing circuit means and provides a second mode control signal for establishing said playback mode of said optical head.

4. A reproduing apparatus as in claim 3, wherein said processing circuit means comprises:

an interpolating circuit for accepting said decoded program information data and correcting errors therein; and a digital-to-analog converter for converting said error-corrected, decoded program information data into program information.

5. A method for reproducing program information from a substantially planar disc containing a plurality of blocks of digital program information data, each block including address data, the method comprising:
searching the medium to provide an output comprising digital program information data and address data for use in locating a predetermined address data associated with predetermined program information;
generating a silent-data signal corresponding to program information data substantially without program information for conversion into program information during said searching step;
decoding said silent-data signal generated during said searching step to provide said program information as silent program information;
detecting said predetermined address data in said output;
reading the medium in response to detection of said predetermined address data to provide an output comprising program information data for conversion into said predetermined program information; and
decoding said program information data during said reading step to provide said predetermined program information at a predetermined delay time after said decoding begins, whereby noise generated by the conversion of reproduced program information is suppressed during said searching step.

6. A method as in claim 5; wherein said reading step comprises the sub-step of initiating the coversion into program information of program information data from the disc in response to detection of said predetermined address data.

7. A method as in claim 5; further comprising the steps of:
interpolating said decoded program information data to provide error-corrected, decoded program information data; and
converting said error-corrected, decoded program information into program information representing an audio signal.

* * * * *